United States Patent [19]
White et al.

[11] Patent Number: 5,719,369
[45] Date of Patent: Feb. 17, 1998

[54] STRESS CORROSION CRACK REPAIR BY PLASMA ARC WELDING UNDERWATER WELDING

[75] Inventors: Raymond Alan White; Harvey Donald Solomon, both of Schenectady; Robert Anthony Fusaro, Jr., Cobleskill, all of N.Y.

[73] Assignee: General Electric Company, Schenectady, N.Y.

[21] Appl. No.: 629,290

[22] Filed: Apr. 8, 1996

[51] Int. Cl.$^6$ .................................................. B23K 10/00
[52] U.S. Cl. ........................ 219/121.46; 219/121.45; 219/121.59; 219/72
[58] Field of Search .................... 219/121.43, 121.46, 219/121.59, 121.48, 121.51, 72, 76.11, 73, 74

[56] References Cited

U.S. PATENT DOCUMENTS

| | | | |
|---|---|---|---|
| 3,898,418 | 8/1975 | Hasui | 219/121.59 |
| 4,039,798 | 8/1977 | Lythall et al. | 219/121.45 |
| 4,154,999 | 5/1979 | Pinfold et al. | 219/72 |
| 4,649,858 | 3/1987 | Sakai et al. | 118/697 |
| 5,412,176 | 5/1995 | Keenan | 219/72 |

*Primary Examiner*—Mark H. Paschall
*Attorney, Agent, or Firm*—Ernest G. Cusick; William H. Pittman

[57] ABSTRACT

Stress corrosion cracking damage to stainless steels and nickel base superalloys is repaired by underwater plasma transferred arc welding which under conditions which reduce residual tensile stresses in the weld and adjacent portions of the repaired structure.

5 Claims, 7 Drawing Sheets

STRESS CORROSION CRACK REPAIR BY PLASMA ARC WELDING UNDERWATER WELDING

This invention is directed to welding of stainless steels and nickel base superalloys. In another aspect the invention is directed to prevention of damage to such alloys caused by stress corrosion cracking, helium embrittlement, and hot cracking. More particularly, the invention concerns the use of underwater plasma transferred arc welding to repair and prevent both stress corrosion and hot cracking damage to structures constructed of alloys which are susceptible to such cracking.

BACKGROUND OF THE INVENTION

Thermal welding involves local heating of the joint between the two sections that one wishes to join and this causes local melting of the joint and any filler metal that is added to the joint. The weld results from the solidification of this melted material. This local heating not only causes local melting, it also causes an expansion of the metals that are adjacent to the weld pool. This expansion is followed by contraction that occurs during cooling. The temperature gradient that is inherent in welding thus leads to a gradient in the thermal strain and this leads to the development of the residual stresses. These stresses are termed residual because they are present as a residual to the welding operation. They are internal to the materials being welded, i.e., no external tractions are required. These stresses are present in the solidified weld metal and in the heat affected zone (HAZ) which surrounds the weld. In conventional welds, these stresses are generally tensile within the weld and HAZ. They generally become compressive further from the weld, but the magnitude of the compressive stress is generally less than the magnitude of the tensile stress. The overall forces must balance, with this being accomplished by higher local tensile stresses being balanced by compressive stresses which are lower in magnitude but extend over a larger volume.

The magnitude and distribution of these residual stresses are determined by the heat added to the weld, the geometry of the sections being welded, the thermal properties of the materials being welded, and the heat transfer out of the weld and HAZ. The exact thermal gradient depends upon the balance of the heat input due to the welding and the rate at which this heat is removed. The boundary condition that is considered in conventional welding assumes that this heat is removed by conduction into the cooler volumes of surrounding metal i.e., those volumes that are further from the weld of the materials being welded.

Relatively little heat is removed by radiation from the weld and HAZ, or by conduction through the gas which contacts the external surface of the weld and HAZ. The invention being disclosed here alters this, causing relatively large compressive residual stresses to be developed within the weld and HAZ. This is done by performing the welding underwater. The water now acts as a conduction medium which very efficiently removes heat from the surface of the weld and HAZ. This altered heat flow results in the development of compressive stresses in the weld and HAZ. This is important because the development of these compressive stresses can prevent hot cracking or He cracking which develops as the weld cools, or stress corrosion cracking which occurs subsequent to the welding, when the weld and HAZ are exposed to conditions which tend to promote such cracking.

Hot cracking results from the action of tensile stresses on the solidifying weld. A weld generally does not solidify at a single defined temperature. Rather, unless one is dealing with an ultra pure single element or single compound material, the solidification occurs over a temperature range. As solidification occurs, the contraction which develops during solidification or that due to the decrease in temperature, causes stresses to be developed. When these stresses act on solidifying material they cause hot cracks to develop. This is because the liquid that is present cannot support a tensile stress. This cracking can be prevented if compressive rather than tensile stresses are developed.

Helium embrittlement also occurs due to the action of tensile stresses which are developed during cooling, and it can also be prevented if compressive stresses rather than tensile stresses are developed. Helium embrittlement results for the development of internal He, which is produced by the nuclear radiation. This phenomena prevents successful repair welding on irradiated materials. The development of compressive stresses makes these repairs possible.

The development of compressive residual stresses can also act to mitigate against stress corrosion cracking (SCC). As its name implies, stress corrosion cracking requires the action of stress, and residual stress can be an important source of these stresses. SCC develops after welding, when the weld and HAZ are exposed to an appropriate media. It can be prevented if tensile stresses are prevented from acting in the presence of this media. Thus, the tendency for SCC can be minimized if compressive rather than tensile residual stresses are developed.

It has now been found that the plasma transferred arc welding repair of stress corrosion cracking damage in water exposed portions of nuclear reactors and similar devices and structures can be achieved by carrying out the welding process underwater. The welding process comprises establishing the requisite conditions, forming a weld pool of molten metal, cooling the weld pool to form a metallurgical bond between adjacent unmelted zones, and quenching the weld to an ambient temperature below the melting range. The weld pool can be formed from a compatible alloy filler metal supplied in the powder or wire form or autogenously from the substrate being repaired. Contact of the cooling weld pool with the ambient water provides heat flow characteristics which reduce tensile stresses and promotes the development of compressive stresses.

DESCRIPTION OF THE INVENTION

It is clear that there are numerous benefits that result from the development of compressive rather than tensile residual stresses, and this invention produces these favorable stresses. These stresses are developed when welding is done underwater, with the use of a local exclusion device which keeps the water away from the molten weld pool. When the welding torch moves, it uncovers the weld, which by this time has solidified. Nonetheless, the heat transfer away form the weld and HAZ is altered by making the weld underwater, and this causes the development of the compressive stresses.

This underwater welding can be done at shallow or deep depths because the exclusion device is pressurized to just above the ambient pressure. The benefit can be achieved with or without the use of filler metal. Conventional filler metal can be used or special filler metal which mitigates hot cracking, He embrittlement or SCC.

It has now been found that plasma transfer arc welding (PTA) can be used underwater to prevent hot cracking, He embrittlement and mitigate against SCC. An exclusion device was used which was pressurized to a level equivalent to 80 feet of water. This is done to enable repair welds to be made in a nuclear reactor without the necessity for the water being drained (which would require the removal of the nuclear fuel and the use of shielding to replace the shielding effect of the water). Welding requires the proper establishment of a weld pool, proper bonding of the weld pool and materials to be joined and crack free solidification of the weld pool. To do this underwater requires the use of a local exclusion device to keep the water away for the molten weld pool. This weld pool can be formed autogenously for the materials being joined or with filler metal, which can be introduced into the weld pool from powder or wire, or as sheet or wire which can be laid down in the joint prior to welding.

The method of this invention provides a welding or cladding technique which reduces tensile stress and promotes formation of residual compressive stress in the heat affected zone of the material being treated. In the practice of the invention a local molten weld pool is formed by a suitable heat source such as a welding torch within a protected zone from which the ambient environment is excluded. The exclusion device is attached to and moves with the torch or other heat supplying apparatus. As the torch and exclusion device move along the path, the weld pool begins to cool and as it passes out of the protected zone the weld is exposed to the ambient environment which acts as a quenching medium. The quenching medium rapidly cools the top surface of the weld and the heat affected zone of the material being treated. Heat is removed from the fused weld and surrounding material by conduction via the quenching medium rather than by convection as in conventional air welding. Some heat is dissipated by heat flow within the bulk material being treated. However, a major heat flow for the method of this invention is through the quench medium. The effect of this heat flow phenomenon is the formation of compressive stress in the weld and nearby heat affected zone.

The drawings describe, in generic terms, the equipment which can be utilized or modified to carry out the invention.

Figure 1:
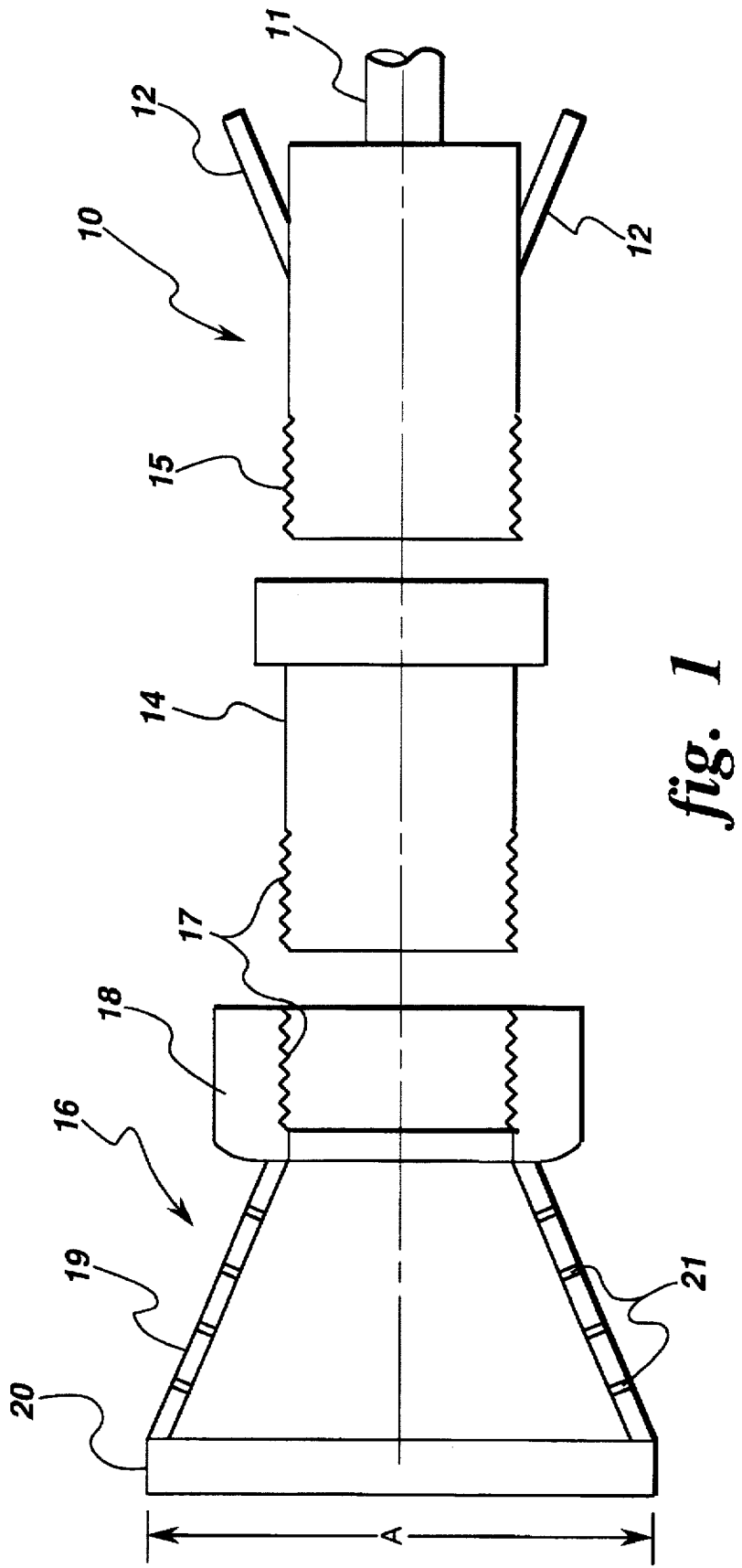
FIG. 1 is an exploded cross-sectional view of a torch and liquid exclusion device providing a liquid exclusion zone.

FIG. 1 shows a welding torch 10, e.g., a plasma transferred arc, hereafter sometimes referred to as a PTA torch, a gas lens 14, and a cross sectional view of cup shaped fluid exclusion device 16 useful in the practice of this invention.

Plasma transferred arc torches and gas lenses are well known in the art. Although the invention is described in terms of plasma transferred arc welding, the concept of residual compressive stress development by underwater welding is applicable to other types of welding apparatus such as laser, tungsten inert gas, and metal inert gas welding.

Referring now to FIG. 1, PTA torch 10 includes electrodes to which a voltage and current appropriate to the maintenance of a welding arc and a gas inlet 11 to receive a flow of gas which is intended to serve to regulate the shape of the plasma developed by the arc. This gas is generally divided into a so-called plasma center gas flow around the central electrode for supplying gas to the plasma and a so-called shielding gas flow which is normally intended to prevent oxidation of the weld pool and HAZ, and here is additionally intended to displace ambient gases or liquids, at ambient hydrostatic pressures and to contain the perimeter of the plasma. These gas flows are modified and directed in the immediate vicinity of the arc plasma by a gas lens of a commercially available type, the details of which are generally unimportant to the practice of the invention. The gas lens is provided with threads (not shown) which mate with threads 15 on the PTA torch for facility of replacement and interchange. Welding materials in the form of a powder may be introduced into the torch at inlets 12 and which form part of the system in accordance with the invention which will be discussed in greater detail below.

The exclusion device 16, in accordance with the invention, is similarly fitted to the gas lens or torch with mating threads 17 formed on a mounting collar portion 18. The body 19 of the exclusion device 16 can be conical or more generally cylindrical as may be dictated by providing an end dimension A of about one to three inches. This dimension A provides an exclusion region which is larger than the length of the weld pool. Solidification of the weld should begin inside the exclusion region. Exposure of the weld to the ambient water occurs after onset of solidification of the weld pool. Thus the dimension A is an important aspect of the invention for the development of compressive force within the weld.

With respect to exclusion of ambient liquids, the dimension A is not critical but, as a practical matter, should not be so large as to encompass severe topology to which the skirt 20 cannot conform or to provide a perimeter of such length as to present increased gas escape area such as would then require increased volumes of gas to maintain liquid exclusion. The minimum size should provide for avoidance of damage by the heat of the welding process and too rapid quenching of the weld (e.g. allowing the liquid to contact the molten weld pool).

The purpose of the body 19 of the exclusion device 16 is to impose a favorable geometry on the exclusion region which cannot otherwise be maintained against high hydrostatic pressures. At high hydrostatic pressures, the collapse of gas bubbles in the vicinity of the arc allows the extremely rapid ingress of fluid toward the arc cannot be reliably maintained. At the same time, it is desirable that turbulent or high velocity gas flows in the vicinity of the arc and the workpiece be avoided.

Skirt 20 may be of woven metal provided at the distal end of the exclusion device, by spot welding, to provide compliance to the workpiece surface and weld bead or cladding overlay as the weld is made and to provide for escape of gases through the body 19 of exclusion device 16 by means of relatively small apertures 21 evenly distributed over body 19. The diameter of the apertures is not critical so long as the escape of gas against the hydrostatic pressure is restricted sufficiently to maintain gas pressure within the exclusion device and that gas bubbles substantially fill the apertures. Alternatively, body 19 may be fabricated of closely device wire or fiber-shaped elements which can be woven or fitted and which provide further compliance with the surface of the workpiece and weld. The escape of gases though the apertures or spaces between wires or fibers displaces liquids which would otherwise be forced inward by hydrostatic pressure. The confinement of the gas by exclusion device 16 also allows the exclusion zone to be reliably maintained with reduced gas flow volume by maintaining a pressure in excess of the ambient hydrostatic pressure to water depths well in excess of eighty feet by constriction of the paths by which gas is allowed to escape from the exclusion device.

It should also be understood that while the exclusion region can be maintained by a combination of the plasma center gas and the shielding gas, possibly supplemented to some degree by the powder carrier or transport gas, a separate gas supply can be provided for the exclusion device itself. Therefore, the use of an exclusion device as described above need not impose any particular limitations on the gas supplies provided for operation of the welding torch. By the same token, while use with a PTA torch is presently preferred, use of an exclusion device in accordance with the invention can be used with any heat source including oxy-acetylene and carbon arc torches and tungsten inert gas torches, and gas metal arc torches as well as plasma torches described above. Of course, it should be recognized that the basic invention, as described above, does not rely at all on the use of powdered weld material alluded to above and a preferred delivery system for which, in accordance with the invention, will be described below but, rather, the invention may be practiced using conventional welding rods by continuous feed of welding alloy in wire or powder form or by forming the weld pool autogenously from the substrates or bodies to be welded together.

Figure 2:
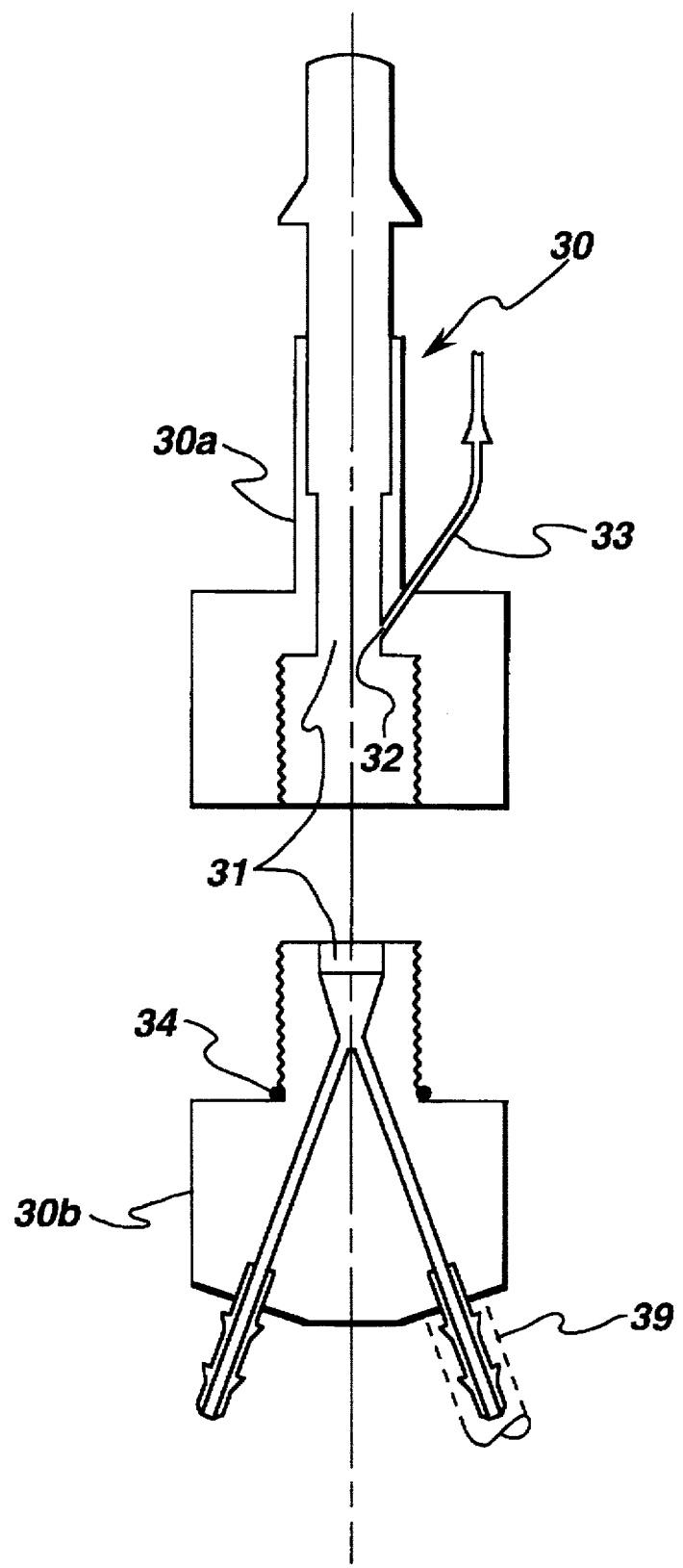
FIG. 2 is an exploded cross-sectional view of a powder splitter with a pressure relief stem.

FIG. 2 shows a modified Y-device 30 as a single to double feed hose powder splitter. The Y-device is similar to devices such as would normally be mounted at the bottom of a gravity fed powder hoppers located about three feet or less above the torch during welding. However, as shown, the Y-device is modified by enlarging the inner cavity 31 and providing a hole 32 in the supply side of the device to which a tube 33 is attached. These modifications can be facilitated by forming the Y-device in two portions 30a, 30b threaded to each other and sealed with an O-ring seal 34, as shown. This modified Y-device is preferably mounted closely above the torch. Powder can be fed to the torch through hose 39 attached to barbed devices mounted on the lower end of the Y-device.

By the use of a modified Y-device 30, a controlled amount of the powder transport gas flow can be bled off through hole 32 and tube 33, allowing a much higher gas flow rate to be used for powder transport than the gas flow rate allowed to enter the torch. The gravity feed from the splitter thus provided may be sufficient to feed powder to the torch if the pressure within the splitter balances the pressure within the torch or exclusion region as defined by the exclusion device 16 so that reverse gas flow from the torch to the splitter does not occur. However, it is considered preferable for regulation of material flow for a relatively small volume of gas to be forced from the splitter to the torch to facilitate powder delivery thereto. In any case, the volume and velocity of gas forced into the nozzle may be readily reduced to levels which do not significantly distort the heat source and allow a single bead weld to be formed. It should also be understood that the principle of bleeding off additional gas flow, used to facilitate powder transport, can be applied to a hopper of any size. However, a small size hopper mounted near or on the torch is preferred since it has the advantages of accommodating close clearances to near the weld location, greater potential reduction of gas flow to the torch consistent with good powder feed and a capability of being constructed to withstand high internal or external pressures. The small size is particularly convenient since existing hardware can be modified to provide the function of improved powder feed without significant distortion of the heat source.

Figure 3:
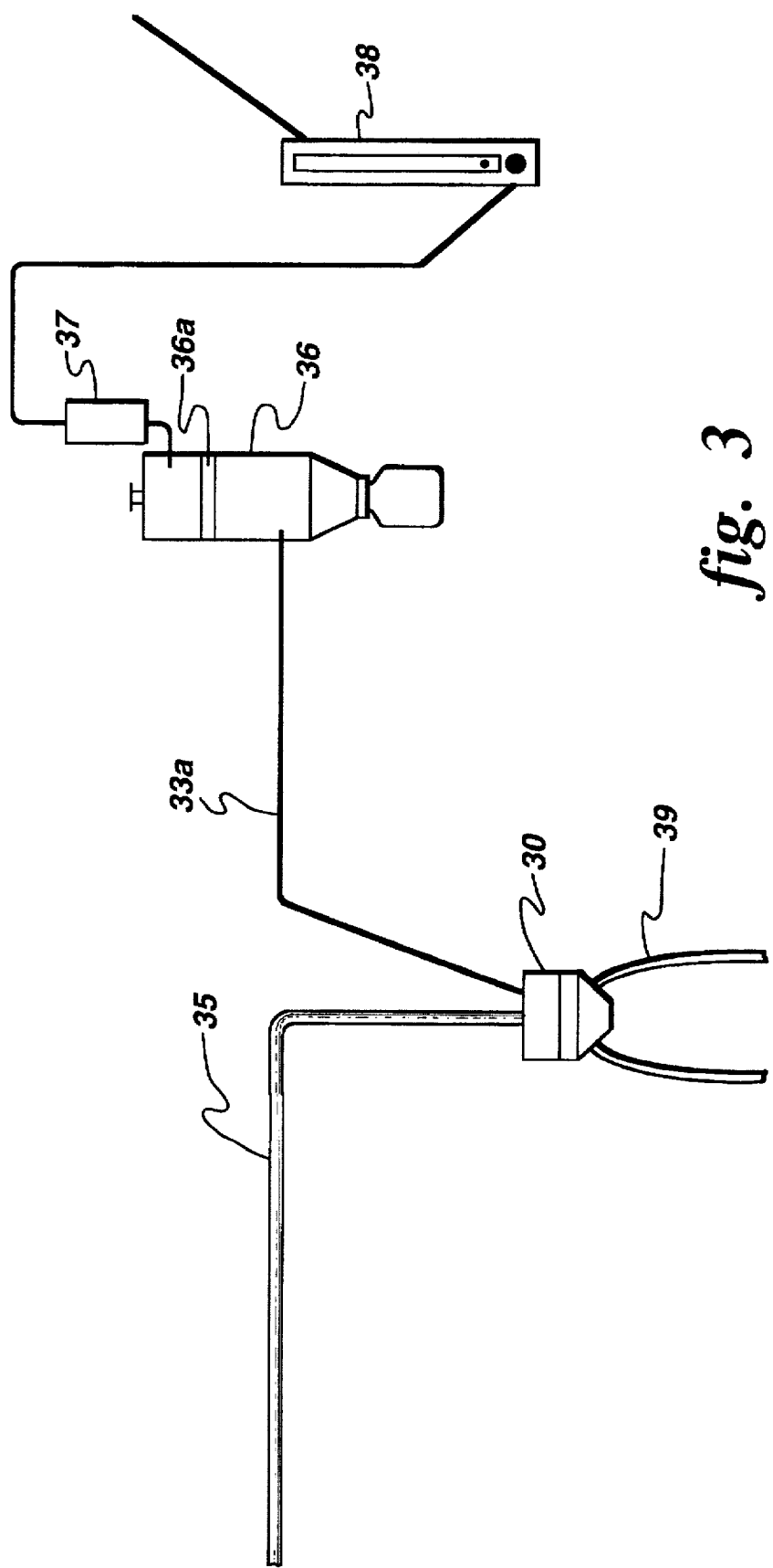
FIG. 3 is an overall view of a powder material delivery system.

A representative powder transport system is illustrated in FIG. 3. Powder weld material is transported to Y-device distribution block 30 entrained in a preferably inert gas at high pressure and flow rate through hose 35. The bled off transport gas, which will contain some amount of powder is carried by pressure relief line 33a to a gravity powder separator or collector 36. Separation of residual powder from the gas may be enhanced by inclusion of a baffle 36a. For safety, an over pressure relief valve may also be provided and will achieve the additional function of preventing excessive gas pressure build-up in Y-device 30 which would increase gas flow to the torch. Separated gas is allowed to flow from the upper portion of powder separator and collector 36 through a water vapor filter 37 and a flow meter 38 so that the difference in the amount of transport gas above the amount of gas permitted to escape can be regulated. Of course, this difference between transport and exhaust gas flow is delivered to the torch to assist in powder delivery and maintenance of the exclusion region.

An exclusion region can be maintained and powder weld material can be delivered to a torch operating at such hydrostatic pressures without distortion of the heat source, resulting in high quality welds. Additionally, it has been found that submerged welding facilitated by these structures is capable of producing residual compressive stresses in welds with consequent reduction in hot cracking, helium cracking, and stress corrosion cracking. The mechanism of reduced cracking force is based on the existence of persistent compressive forces within the weld and adjacent regions of the heat effected material.

The heat required to establish compressive stress is expected to be a function of the material and relative dimensions of the exclusion device. For the exclusion device which has been used the production of compressive forces is most pronounced at heat inputs generally considered as exceeding 1.0 Kilojoules per millimeter of weld. This heat input specification will be a function of the diameter of the exclusion device.

Figure 4:
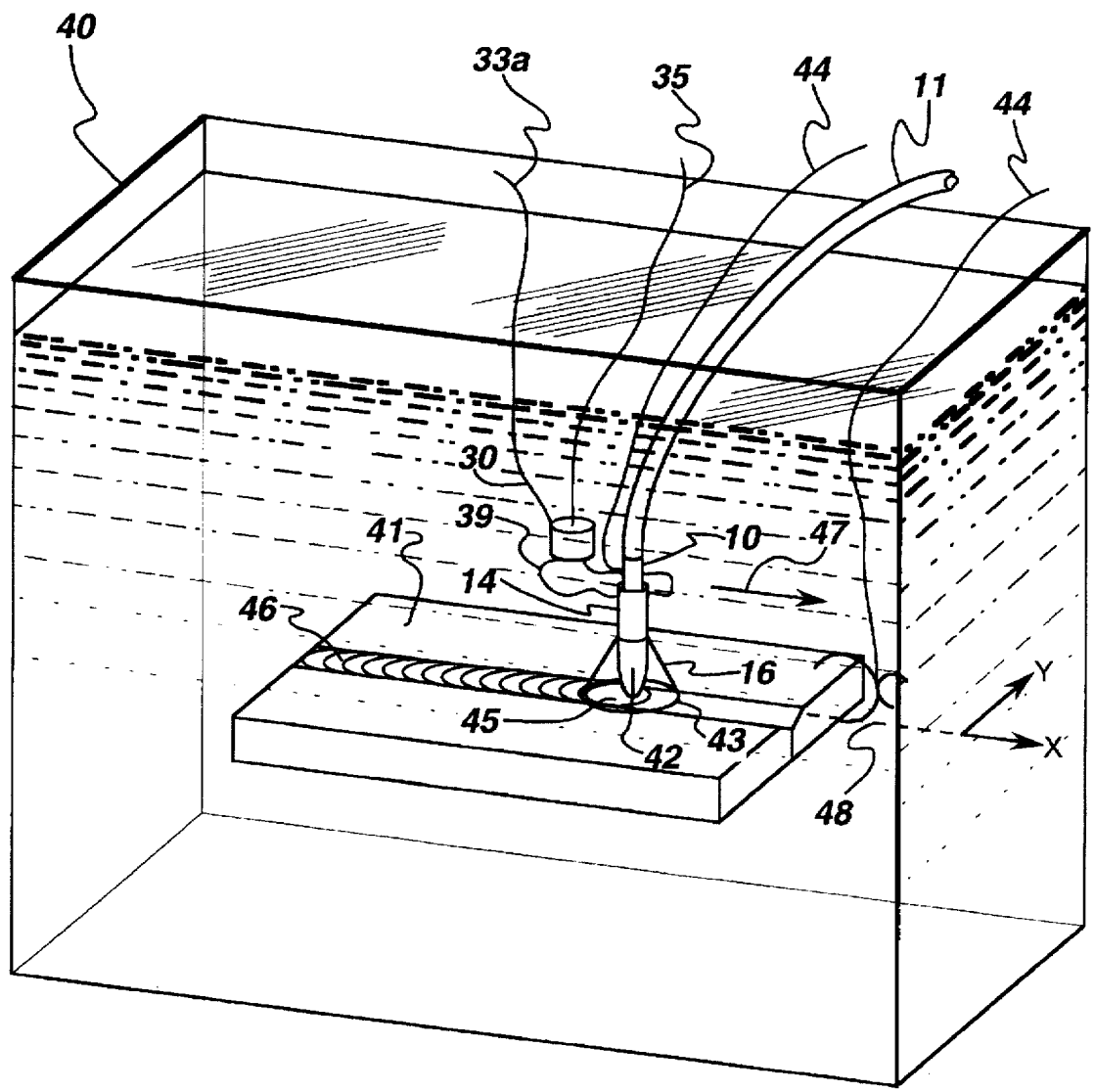
FIG. 4 illustrates an exemplary use of the invention and conditions sufficient to the production of persistent compressive forces in a weldment.

FIG. 4 illustrates the making of a weld under conditions sufficient to generate residual compressive forces and the inhibition of hot cracking, and stress corrosion cracking. The submerged welding is schematically depicted by a fluid-containing tank 40 similar to that used in experimental trials of the invention but is otherwise unnecessary to the practice of the invention. The torch 10 with inert gas supply line 11, gas lens 14, and exclusion device 16 are shown assembled and located adjacent the surface 41 at which the weld is to be made and such that the plasma 42 extends to that surface. It should be understood that exclusion device 16 is not necessary except at substantial depths causing large hydrostatic pressure and that an exclusion region of approximately the same size 43 could be established by gas flow alone. On the other hand, the tank used in experimental trials of the invention could be pressurized to simulate depths of in excess of eighty feet where the exclusion device 16 would be necessary. Weld material is supplied through hose 35 to Y-device distribution block 30 and bled off transport gas exhausted through hose 33a after pressure and flow regulation and powder separation as discussed above. Powdered weld material is transported to torch 10 through hoses 39, also as discussed above. A plasma transferred arc torch being assumed, electrical power is supplied to the torch 10 and workpiece 41 through electrical connections 44.

To make a weld, inert gas is supplied through hose 11 to develop an exclusion region an arc is struck in torch 10 which supplies heat to surface 41 and develops a pool of molten metal 45 to which powdered weld material and flux is added through hoses 39. The torch is then moved in the direction indicated by arrow 47 with the weld pool 45 trailing behind the plasma 42. Dimension A of the exclusion region is chosen such that A/2 will exceed the length of the weld pool 45 so that the weld will be quenched shortly after the onset of solidification, as shown, and persistent compressive forces will be developed in weld 46. These forces are plotted in FIGS. 5 and 6 as a function of distance from the centerline 48 of the weld in the X and Y directions indicated in FIG. 4.

Figure 5:
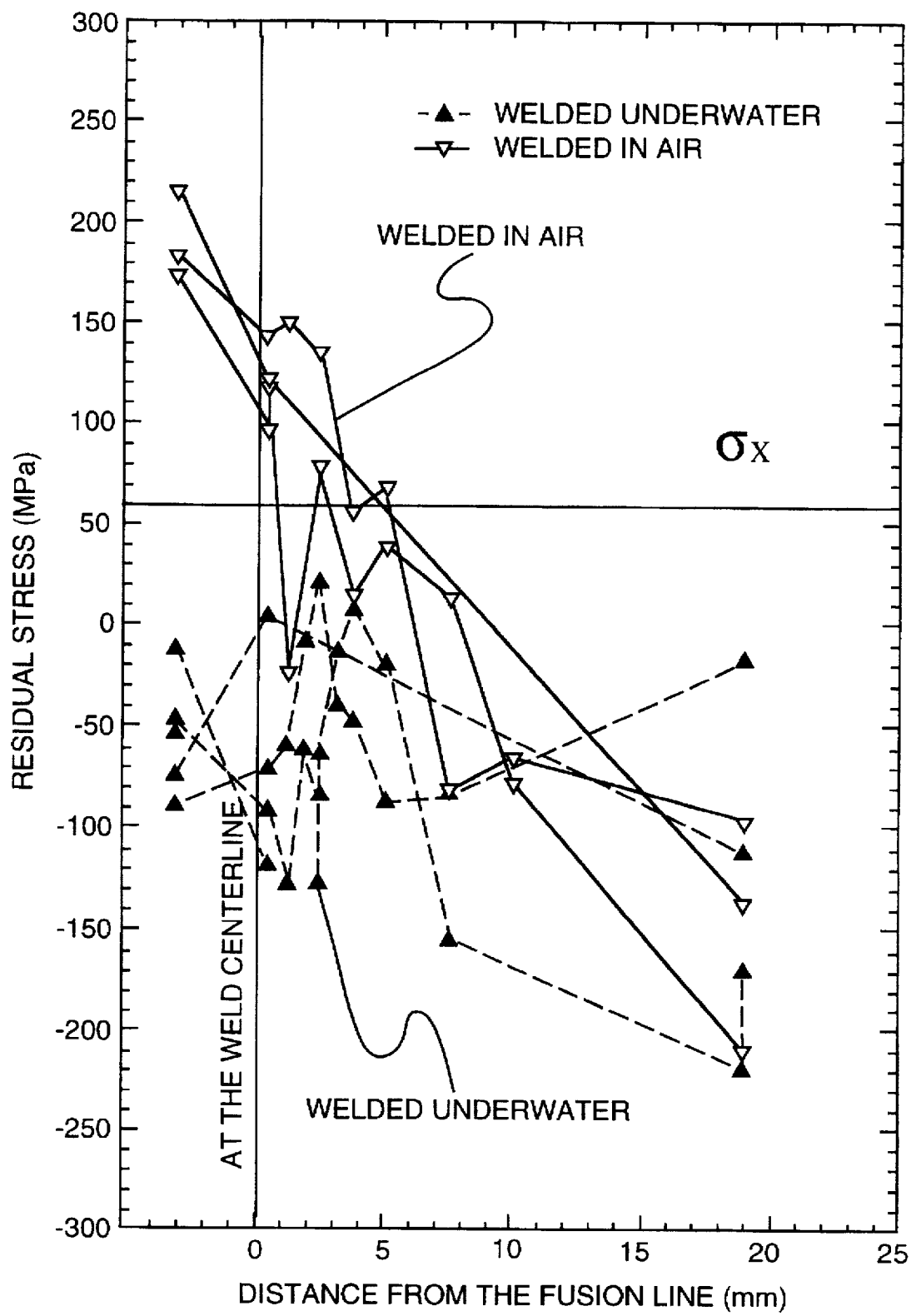
FIG. 5 is a graph of residual stresses developed in a weld and surrounding material at differing distances from the fusion line of the weld in a direction parallel to the axis of the weld.
Figure 6:
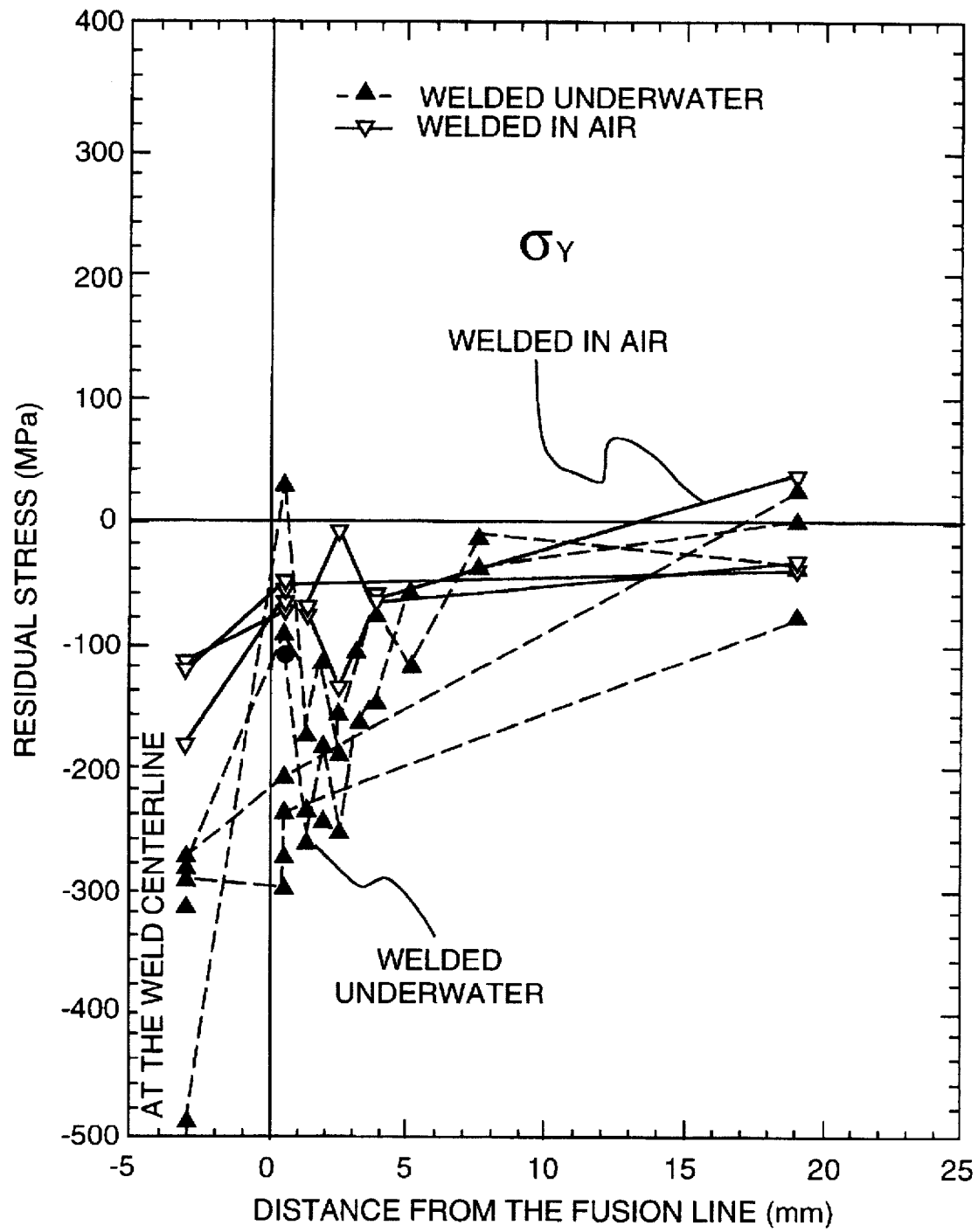
FIG. 6 is a graph of residual stresses developed in a weld and surrounding material at differing distances from the fusion line of the weld in a direction perpendicular to the surface of the weld.

In FIGS. 5 and 6, the stress in a plate welded in accordance with the invention compared to a plate conventionally welded in air. Tensile stresses are plotted as positive and compressive stresses are plotted as negative. The measurements depicted were made by standard x-ray scattering techniques. It can be seen from FIG. 5 that welding in air causes substantial tensile forces to develop in a direction parallel to the weld direction which extend for a substantial distance across the plate surface and thus sensitized to stress corrosion cracking and which are maximized near the centerline of the weld. For the same air-welded plate, only slight compressive forces will be developed far from the fusion line of the weld while substantial tensile forces are developed within the weld (FIG. 5). In contrast, the weld produced underwater in accordance with the invention shows predominantly compressive stresses at the weld centerline and very significant compressive stresses from 5 mm to 20 mm distant from the weld centerline (FIG. 5). As shown in FIG. 6, very significant compressive stresses are developed within the weld and continues at substantial levels to at least 19 mm from the fusion line relatively slight tensile forces being occasionally observed in some samples near the fusion line.

Figure 7:
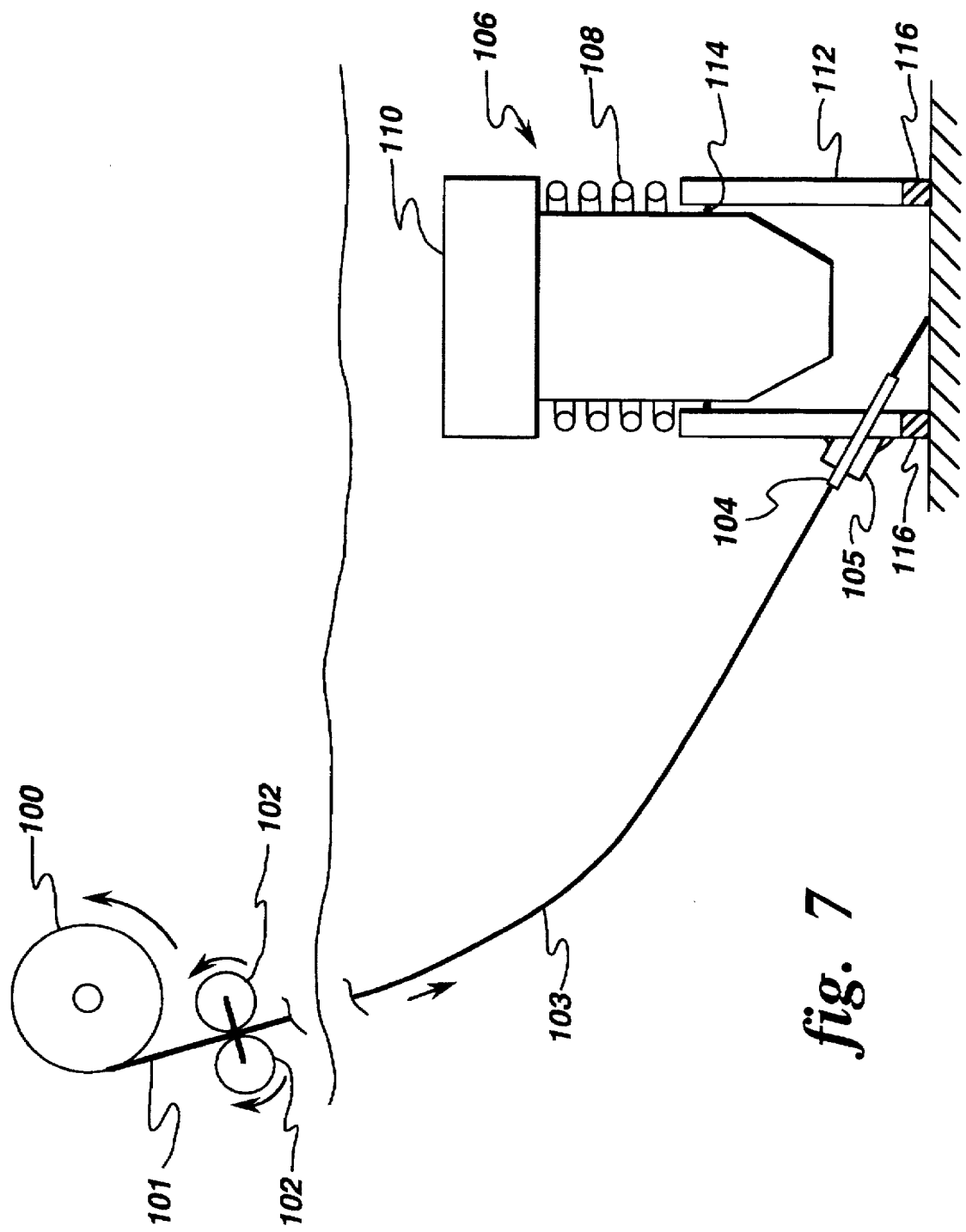
FIG. 7 is a schematic drawing of a wire-fed underwater plasma transfer arc system.

FIG. 7 illustrates the use of filler wire instead of powder to make up the weld pool. It is also possible to melt the regions containing cracks and thereby facilitate the repair autogenously.

Experimental Procedure

Crack specimens were made using 1 in. thick 304 stainless steel. For the PTA portion of the crack healing investigation, cracks were simulated in one of two ways. Either plates were butted together, edge to edge, and shimmed to obtain a 1 in. deep "crack" of controlled width, or an abrasive wheel was plunged into the surface of a plate to create a "penny-shaped" crack. In the case of specimens made by butting the edges of two plates, the cracks were either left "open" by welding only the end edges and leaving the top and bottom of the crack open, or they were deliberately "closed" by welding the shimmed specimen completely on both end edges and on the bottom to simulate an occluded crack. By nature, all "penny-shaped" cracks were "closed." Some of the butted specimens were made with a variable width by shimming the ends to different widths before tacking. This allowed quick determination of a maximum width which could be fused with a particular set of welding parameters. One final crack specimen design simulated two side-by-side cracks by sandwiching a ⅛-in.-thick 304 S.S. plate between two butted 1 in. thick plates. In this case, they were always made to be "closed" cracks.

All work was done underwater within a tank which is designed to be pressurized to simulate various depths of water head. A Stellite Starweld PTA system with a modified Model 610 torch was used. The torch modifications allowed for local water exclusion and remote powder feed under back pressure conditions created by the simulated 80 feet of water depth. Torch hardware and gas flow conditions were not varied within the limited scope of this investigation. These parameters as well as amperage, voltage, and travel speed were generally maintained at constant settings. Occasionally, amperage and travel speed were varied to increase heat input in an attempt to close wide or side-by-side cracks, or to increase depth of penetration. The nominal hardware, gas flow and power parameters are shown in Table 1.

Evaluation techniques employed to characterize the results of attempts to heal the simulated "cracks" were visual inspection, metallographic examination of a transverse section of the completed weld, and residual stress measurements on a representative specimen Visual inspection was used to determine whether the crack had been successfully sealed and to measure weld bead width using vernier calipers. Metallography established the depth of penetration and weld quality with respect to possible defects such as porosity or cracking.

TABLE 1

| Table of Nominal Underwater PTA Crack Healing Parameters | |
|---|---|
| Nozzle | Medium (3/32" orifice) |
| Electrode | ⅛" diameter |
| Torch Stand Off | 5/16" |
| Center Gas Setting | 65 |
| Powder Gas Setting | 115 |
|  | (when feeding powder) |
| Relief Gas Setting | 20 |
|  | (when feeding powder) |
| Shield Gas Setting | 130 |
| Amperage | 110 amps |
| Voltage | 30 v (nom.) |
| Travel Speed | 4"/min |

@ 90 psi Ar Supply, Exhaust to 80' Equivalent Water Depth
@ 90 psi Ar Supply, Exhaust to Ambient (Relief) or 80' Water (Shield)

Results

The results of this study demonstrate the ability to hermetically fuse simulated cracks of widths that should surpass that expected in intergranular stress corrosion and also show considerable depth of penetration for improved structural integrity. Table 2 lists the conditions, parameters and measured weld bead dimensions of underwater PTA crack healing trials. The first twelve entries in Table 2 describe four open, variable-width crack specimens. Each was sectioned in the center of the weld (middle position), and half way between the start and center of the weld (start) and the center and end of the weld (end). All metallographic sections were transverse to the welding direction. For these twelve entries, data which applies to the entire crack specimen are shown without parenthesis and data which applies only to the particular section location are shown in parenthesis. All other entries record dimension data on a single section taken at the center of the weld bead. Table 3 lists the results of X-Ray diffraction residual stress measurements made on a successfully sealed 0.005 in. wide, 1 in. deep "closed" crack specimen made with the nominal 110 amp/4 in. per min/ autogenous weld parameters.

TABLE 2

Underwater PTA Crack Healing Parameters and Weld Dimensions

| Run No. | Powder Feed Rate (rpm) | Crack Type | Crack Width (in.) | v (in/min) | I (amps) | Power (KJ/in.) | Depth @ Crack (in.) | Depth Max. (in.) | Width (in.) | $D_{(Max)}/W$ |
|---|---|---|---|---|---|---|---|---|---|---|
| 100694.2 (start) | | Autogenous | Open | .008–.023 (~.012) | 4 | 110 | 46.2 | (0.050) | (0.050) | (0.325) | (0.154) |
| 100694-2 (middle) | | Autogenous | Open | .008–.023 (~.016) | 4 | 110 | 46.2 | (0.063) | (0.063) | (0.380) | (0.166) |
| 100694-2 (end) | | Autogenous | Open | .008–.023 (~.020) | 4 | 110 | 46.2 | (0.061) | (0.061) | (0.375) | (0.163) |
| 100694-3 (start) | | Autogenous | Open | .023–.068 (~.034) | 4 | 110 | 46.2 | (0.059) | (0.085) | (0.310) | (0.274) |
| 100694-3 (middle) | | Autogenous | Open | 023–.068 (~.045) | 4 | 110 | 46.2 | (0.064) | (0.071) | (0.395) | (0.180) |
| 100694-3 (end) | | Autogenous | Open | 023–.068 (~.056) | 4 | 110 | 46.2 | (0.089) | (0.111) | (0.385) | (0.288) |
| 100694-4 (start) | | Autogenous | Open | 038–.112 (~.057) | 4 | 110 | 46.2 | (0.064) | (0.071) | (0.345) | (0.206) |
| 100694-4 (middle) | | Autogenous | Open | 038–.112 (~.075) | 4 | 110 | 46.2 | (0.106) | (0.106) | (0.385) | (0.275) |
| 100694-4 (end) | | Autogenous | Open** | 038–.112 (~.094) | 4 | 110 | 46.2 | (0.106) | (0.142) | (0.380) | (0.374) |
| 101194-1 (start) | | Autogenous | Open | 038–.100 (~.054) | 3 | 110 | 61.6 | (0.106) | (0.157) | (0.325) | (0.483) |
| 101194-1 (middle) | | Autogenous | Open | 038–.100 (~.069) | 3 | 110 | 61.6 | (0.130) | (0.130) | (0.400) | (0.325) |
| 101194-1 (end) | | Autogenous | Open* | 038–.100 (~.085) | 3 | 110 | 61.6 | (0.114) | (0.161) | (0.325) | (0.495) |
| 101194-2 | | Autogenous | Open** | ⅛ | 3 | 175 | 113.8 | 0.307 | 0.307 | 0.650 | 0.472 |
| 101194-3 | | Autogenous | Closed | contact | 4 | 110 | 42.9 | 0.059 | 0.071 | 0.330 | 0.215 |
| 101194-4 | | Autogenous | Closed | .005 | 4 | 110 | 42.1 | 0.071 | 0.071 | 0.340 | 0.209 |
| 101194-5 | | Autogenous | Closed | .020 | 4 | 110 | 42.9 | 0.065 | 0.065 | 0.355 | 0.183 |
| 101194-6 | | Autogenous | Closed* | .040 | 4 | 110 | 44.6 | 0.059 | 0.059 | 0.350 | 0.169 |
| 101294-1 | | Autogenous | Penny | .025 | 4 | 110 | 46.2 | 0.094 | 0.094 | 0.410 | 0.229 |
| 102094-2 | | Autogenous | Penny* | .050 | 4 | 110 | 42.9 | 0.097 | 0.102 | 0.320 | 0.319 |
| 102094-1 | | Autogenous | Two Closed | (2);.005 ⅛" apart | 4 | 110 | 42.1 | 0.096 | 0.096 | 0.305 | 0.315 |
| 102094-2 | | Autogenous | Two** Closed | (2);.015 ⅛" apart | 3 | 110 | 50.0 | 0.065 | 0.065 | 0.355 | 0.183 |
| 102494-1 | 0.9 | | Two Closed | (2);.005 ⅛" apart | 3 | 110 | 66.0 | 0.118 | 0.118 | 0.420 | 0.281 |
| 102494-2 | 3.0 | | Open | ⅛ | 2 | 165 | 178.2 | 0.305 | 0.305 | 0.650 | 0.469 |

All welds made on 1" thick 304 S.S., under water at a simulated depth of 80 feet. Inco 82 + 1% Pd powder (−200/+325 mesh) used on those welds with mention of a powder feed rate. All others were made autogenously. All cracks were successfully healed with a single pass weld except as noted by a single or double asterisks.
*Blow hole in the middle of weld.
**Blow hole at the end of weld.

Table 2 contains two calculated values associated with each crack healing trial. The column of "Heat Input" values is the calculated power per inch based on output current and voltage as displayed on the power supply meters. The equation used to calculate this value is as follows:

$$\text{Power(J/in.)} = \frac{(\{V(\text{volts}) \times I(\text{amps})\}}{v(\text{in./min.})} \times 60(\text{sec./min.})$$

Operating supply voltage can be back-calculated from these values. Also, the voltage losses associated with the 25-foot cable lengths used in this setup have been measured to be about 6.5% at 110 A and about 9 to 9.5% at 165–175 A. So the power delivered to the workpiece, neglecting transfer efficiency, would be less than reported in Table 2 by 6.5 to 9.5% depending on the current. The other calculated value is the "aspect ratio" of the welds, or depth of penetration divided by the weld bead width. In this case, the maximum depth of penetration was used.

TABLE 3

Surface Residual Stress Measurements on Representative Underwater PTA Crack Healing Specimen

| | | Residual Stress (ksi) | | |
|---|---|---|---|---|
| Run# | Location* | X-Direction | Y-Direction | Average Peak Width (deg.) |
| 101794-2 | Weld Center | +3.1 (+/−0.4) | −27.4 (+/−0.9) | 1.12 |
| 0.005" wide 1" deep "closed crack" 110 amp/ 28 v/4 ipm) | +0.020 | −1.8 (+/−0.6) | −8.0 (+/−0.7) | 1.07 |
| | +0.125 | +17.7 (+/−1.3) +17.0 (+/−1.2) | −0.1 (+/−1.0) | 2.33 |
| Autogenous; @ 80' | +0.400 | −54.8 (+/−2.2) | −22.1 (+/−1.5) | 2.72 |

*Locations are distances from the weld fusion line in inches.

Reviewing the data in Tables 2 and 3 and visual evaluation of the welds, the following list of conclusions can be made:

At the nominal parameters of 110 A and 4 in./min. travel speed (~⅓ of the rated power of 300 A, 32 V@60% duty cycle), without filler metal addition. Open cracks were sealed to a limit of about 0.1 in. in width to a maximum depth of penetration of about 0.15 in. in a single weld pass. Closed 0.020 in. wide, 1 in. deep cracks were successfully sealed in a single pass. The depth of penetration was 0.065 in. A closed 0.040 in. wide, 1 in. deep crack specimen was not successfully sealed in a single pass. Internal steam pressure resulted in a blow hole in the weld bead. A closed penny-shaped crack 0.025 in. wide and 0.23 in. deep was successfully sealed in a single pass. The depth of penetration was 0.094 in. A closed penny-shaped crack 0.050 in. wide and 0.2 in. deep was unsuccessful because of steam blow hole. Two parallel closed cracks, ⅛ in. apart, each 0.005 in. wide and 1 in. deep were sealed in a single pass to a depth of 0.096 in. Two parallel 0.015 in. wide closed cracks were unsuccessful because of a steam blow hole. At higher amperage levels (~60% of rated power) without filler addition: Open cracks ⅛ in. wide were still not completely sealed; however, depth of penetration was increased to 0.3 in.

At higher amperage levels (~55% of rated power) with filler addition: Open cracks ⅛ in. wide were successfully sealed. The depth of penetration was 0.3 in.

With higher heat input caused by slower travel speed (3 in./min. instead of 4 in./min.) and filler metal addition: Two parallel closed cracks, ⅛ in. apart and 0.005 in. wide were successfully sealed in a single pass to a depth of 0.118 in.

Residual stress measurements made in a representative healed crack specimen revealed predominately compressive surface residual stress. However, the stress levels were somewhat higher (less compressive) than typically found in underwater PTA autogenous welds made on solid 1 in. thick 304 S.S. by about 10 to 15 ksi, resulting in an almost negligible tensile stress value in the weld center (X-Direction only) and moderate tensile stress at ⅛ in. away from the fusion line (X-Direction only). The residual stress values are still much lower than for welds made in air.

The results of these experiments demonstrate the ability to hermetically seal simulated cracks of widths greater than those created by SCC using the underwater PTA process with local water exclusion. UPTA's potential for structural welding was also demonstrated by closing ⅛ in. wide gaps in butted 304 plate to depths of 0.3 in. and widths of 0.65 in. using only about 60% of the available power of the system.

What we claim is:

1. A method for repair, by underwater plasma arc welding, of stress corrosion crack damage in substrates of stainless steel and nickel base superalloy materials which comprises forming a compatible weld pool of a molten metal within an exclusion device at the site of the crack damage to fill the crack, cooling the weld pool to a temperature at about its the melting point to form a metallurgical bond between adjacent unmelted zones, and quenching the weld to the ambient temperature by contact with a quenching medium as the weld emerges from the exclusion device to an ambient temperature below melting range temperatures.

2. A method as recited in claim 1, which comprises quenching the weld by contact with water.

3. A method as recited in claim 1 wherein the weld pool is formed by heat supplied by a plasma transferred arc welding torch within an exclusion device attached to said torch and the quench medium is water.

4. An underwater welding method according to claim 1 which comprises forming a molten metal weld pool within a water free exclusion device by energy supplied by a plasma transferred arc welding torch attached to said exclusion device moving the torch and exclusion device along a path to form a weld, and quenching the weld by contact with water as the weld emerges from the exclusion device.

5. An apparatus for underwater welding comprising a water exclusion device defining a water-free zone when placed on a surface to be welded, a plasma transferred arc welding torch attached to said exclusion device adapted to form a molten weld pool on the surface within the water-free zone, means for moving the exclusion device and torch on the surface to form a weld within the exclusion device, and to thereafter quench the weld by contact with water.

* * * * *